US012552056B2

(12) United States Patent

Ye

(10) Patent No.: US 12,552,056 B2

(45) Date of Patent: Feb. 17, 2026

(54) ELECTRIC SHAVER

(71) Applicant: Shenzhen Shuye Technology Co., Ltd., Guangdong (CN)

(72) Inventor: Hongxin Ye, Zhejiang Province (CN)

(73) Assignee: Shenzhen Shuye Technology Co., Ltd., Shenzhen (CN)

( * ) Notice: Subject to any disclaimer, the term of this patent is extended or adjusted under 35 U.S.C. 154(b) by 384 days.

(21) Appl. No.: 18/295,382

(22) Filed: Apr. 4, 2023

(65) Prior Publication Data

US 2024/0208091 A1 Jun. 27, 2024

(30) Foreign Application Priority Data

Dec. 26, 2022 (CN) ........................ 202211676472.X

(51) Int. Cl.

*B26B 19/02* (2006.01)
*B26B 19/28* (2006.01)
*B26B 19/38* (2006.01)

(52) U.S. Cl.

CPC .............. *B26B 19/02* (2013.01); *B26B 19/28* (2013.01); *B26B 19/3866* (2013.01)

(58) Field of Classification Search

CPC ... B26B 19/28; B26B 19/3866; B26B 19/282; B26B 19/02

USPC ........................................................ 30/43.91

See application file for complete search history.

(56) References Cited

FOREIGN PATENT DOCUMENTS

| | | | | | |
|---|---|---|---|---|---|
| CN | 104044158 A | * | 9/2014 | ......... | B26B 19/3866 |
| CN | 114833875 A | * | 8/2022 | ............. | B26B 19/28 |
| JP | H11285226 A | * | 10/1999 | | |

OTHER PUBLICATIONS

Translation CN 104044158 (Year: 2025).*
CN-114833875-A (Year: 2025).*

* cited by examiner

*Primary Examiner* — Nhat Chieu Q Do

(57) ABSTRACT

The present disclosure provides an electric shaver, including a handle, and a driving device and a hair cutting unit; the driving device includes a motor housing, and a base, a mover component, a stator component, an elastic suspension component, and an elastic support that are disposed in the motor housing; the stator component is fixedly arranged on the base; an end of the elastic suspension component is fixedly connected to the base, and the other end is fixedly connected to the mover component; the base is suspended and connected to the motor housing through the elastic support; the stator component drives the mover component to move reciprocally in a predetermined direction; the mover component is connected to the hair cutting unit; the handle includes a bracket body and a vibration damping device; the vibration damping device includes a vibration damping oscillator and a cushioning mechanism.

20 Claims, 12 Drawing Sheets

ELECTRIC SHAVER

CROSS REFERENCE

The present application claims foreign priority of Chinese Patent Application No. 202211676472.X, filed on Dec. 26, 2022, in the China National Intellectual Property Administration, the entire contents of which are hereby incorporated by reference in its entirety.

TECHNICAL FIELD

The present disclosure relates to the technical field of Electric shavers, and in particular to an electric shaver.

BACKGROUND

The electric shaver includes a driving device and a hair cutting unit. The driving device drives the reciprocating motion of a movable knife of the hair cutting unit relative to a static knife, or the reciprocating motion of two movable knives, in order to realize the cutting of the beard and sideburns. The electric shaver currently has the greater problem for the body vibration amplitude, vibration is strong, and poor usage experience.

The above is only intended to assist in understanding the technical solution of the present disclosure and does not represent an admission that the above is prior art.

SUMMARY OF THE DISCLOSURE

In view of the above problems, the present disclosure proposes an electric shaver, which aims to solve the technical problem of strong vibration of the body of the electric shaver.

To achieve the above purpose, the present disclosure proposes an electric shaver, including a handle, and a driving device and a hair cutting unit disposed at a top of the handle;

wherein the driving device includes a motor housing, and a base, a mover component, a stator component, an elastic suspension component, and an elastic support that are disposed in the motor housing; the stator component is fixedly arranged on the base; an end of the elastic suspension component is fixedly connected to the base, and the other end of the elastic suspension component is fixedly connected to the mover component, such that the mover component is spaced apart from the stator component; the base is suspended and connected to the motor housing through the elastic support; the stator component is capable of driving the mover component to move reciprocally in a predetermined direction by electromagnetic action; the mover component is connected to the hair cutting unit to drive the hair cutting unit to cut hair;

the handle includes a bracket body and a vibration damping device, and the motor housing is fixedly connected to a top of the bracket body; the vibration damping device includes a vibration damping oscillator and a cushioning mechanism, and the vibration damping oscillator is suspended and fixedly connected to the bracket body through the cushioning mechanism, to absorb an angular vibration of the handle triggered by the driving device.

In some embodiments, the bracket body is in a shape of an elongated strip extending up and down, and the vibration damping device is arranged at an end of the bracket body away from the driving device.

In some embodiments, the electric shaver further includes a battery embedded in the bracket body and disposed between the vibration damping device and the driving device.

In some embodiments, the bracket body defines a suspension space, and the cushioning mechanism includes two buffer members; each end of the vibration damping oscillator in the predetermined direction is fixedly connected to the bracket body 110 through a corresponding buffer member to be suspended in the suspension space.

In some embodiments, each buffer member includes at least one plate spring structure extending in the form of a disc; a central connection end of the plate spring structure is fixedly connected to an end of the vibration damping oscillator in the predetermined direction, and an external connection end of the plate spring structure is fixedly connected to the bracket body.

In some embodiments, the vibration damping device includes a connection block fixedly connected to the bracket body; the external connection ends of the two buffer members are fixedly connected to two ends of the connection block, respectively, and the connection block is spaced apart from the vibration damping oscillator.

In some embodiments, the vibration damping oscillator includes a counterweight block and a central shaft; the central shaft is threaded and limited around an axis of the central shaft to be arranged at the counterweight block, and two ends of the central shaft are fixedly connected to the two central connection ends, respectively.

In some embodiments, the central connection end is arranged with a positioning jack, and the central shaft is inserted in the positioning jack; the vibration damping device further includes a first connector, and the first connector penetrates the positioning jack and an end of the central shaft to be fixedly connected to the central connection end and the central shaft.

In some embodiments, the two ends of the central shaft protrude from the counterweight block, and the vibration damping device further includes a first spacer and a second spacer disposed on both sides of the plate spring structure, respectively; the first spacer is sleeved on an outer periphery of the central shaft and sandwiched between the central connection end and the counterweight block; the second spacer is sandwiched between the first connector and the central connection end; the bracket body defines a position avoidance hole facing the first connector, and an inner wall surface of the position avoidance hole is disposed at a periphery of an outer peripheral wall of the second spacer.

In some embodiments, each of opposite side wall surfaces of the connection block extending along the predetermined direction are recessed to define a limiting slot; a top wall of the suspension space is arranged with two limiting protrusions that are opposite to each other and spaced apart; the two limiting protrusions are correspondingly embedded in the two limiting slots to limit a movement of the connection block relative to the bracket body in the predetermined direction; the electric shaver further includes a second connector penetrating a corresponding limiting protrusion and is fixedly connected to the bracket body and the connection block.

In some embodiments, a difference between an inherent frequency of the vibration damping device and an inherent frequency of the driving device is greater than or equal to −5 HZ and less than or equal to 5 HZ; and/or, a mass of the vibration damping oscillator is positively correlated with a mass of the mover component.

In some embodiments, the electric shaver further includes a housing; wherein the housing includes a shank housing and a head housing connected to a top of the shank housing, the driving device is fixedly arranged in the head housing, and the handle is arranged in the shank housing; the bracket body defines a recess adjacent to an upper part of the counterweight block, a sealing ring is embedded in the recess, and the bracket body is connected to an inner wall surface of the housing through the sealing ring; an outer wall surface of the vibration damping oscillator is spaced from the inner wall surface of the housing.

In the electric shaver of the present disclosure, the stator component is fixedly arranged on the base, and an end of the elastic suspension component is fixedly connected to the base and the other end is fixedly connected to the mover component, such that the mover component is spaced apart from the stator component; the base is suspended from the motor housing by the elastic support. In this way, the mover component is connected to the base through the elastic suspension component, and the base is connected to the motor housing through the elastic support, making full use of the weight of the stator component on the base to achieve cushioning and vibration damping, such that the swing of the elastic support relative to the motor housing is less, and thus the vibration amplitude transmitted to the motor housing is less.

In addition, the handle includes the bracket body and the vibration damping device, the motor housing is fixedly connected to the top of the bracket body; the vibration damping device includes the vibration damping oscillator and the cushioning mechanism, the vibration damping oscillator is suspended and fixedly connected to the bracket body through the cushioning mechanism to absorb the angular vibration of the handle caused by the driving device. In this way, the vibration damping device is arranged on the bracket body of the handle, such that the vibration damping vibrator is suspended and fixedly connected to the bracket body by the cushioning mechanism, and the vibration damping vibrator can absorb the angular vibration of the handle and further reduce the vibration transmitted to the handle by the driving device. Therefore, the driving device of the electric shaver of the present disclosure achieves first-level vibration damping through the elastic support member, and the handle achieves second-level vibration damping through the vibration damping device, which can effectively weaken the vibration of the entire handle and make the electric shaver feel better in use.

BRIEF DESCRIPTION OF THE DRAWINGS

In order to more clearly illustrate the technical solutions in the embodiments of the present disclosure, the following is a brief description of the accompanying drawings used in the description of the embodiments, it is obvious that the following description of the accompanying drawings are only some embodiments of the present disclosure, for those skilled in the art, without creative work, other drawings can be obtained based on these drawings.

REFERENCE NUMERALS

Figure 1:
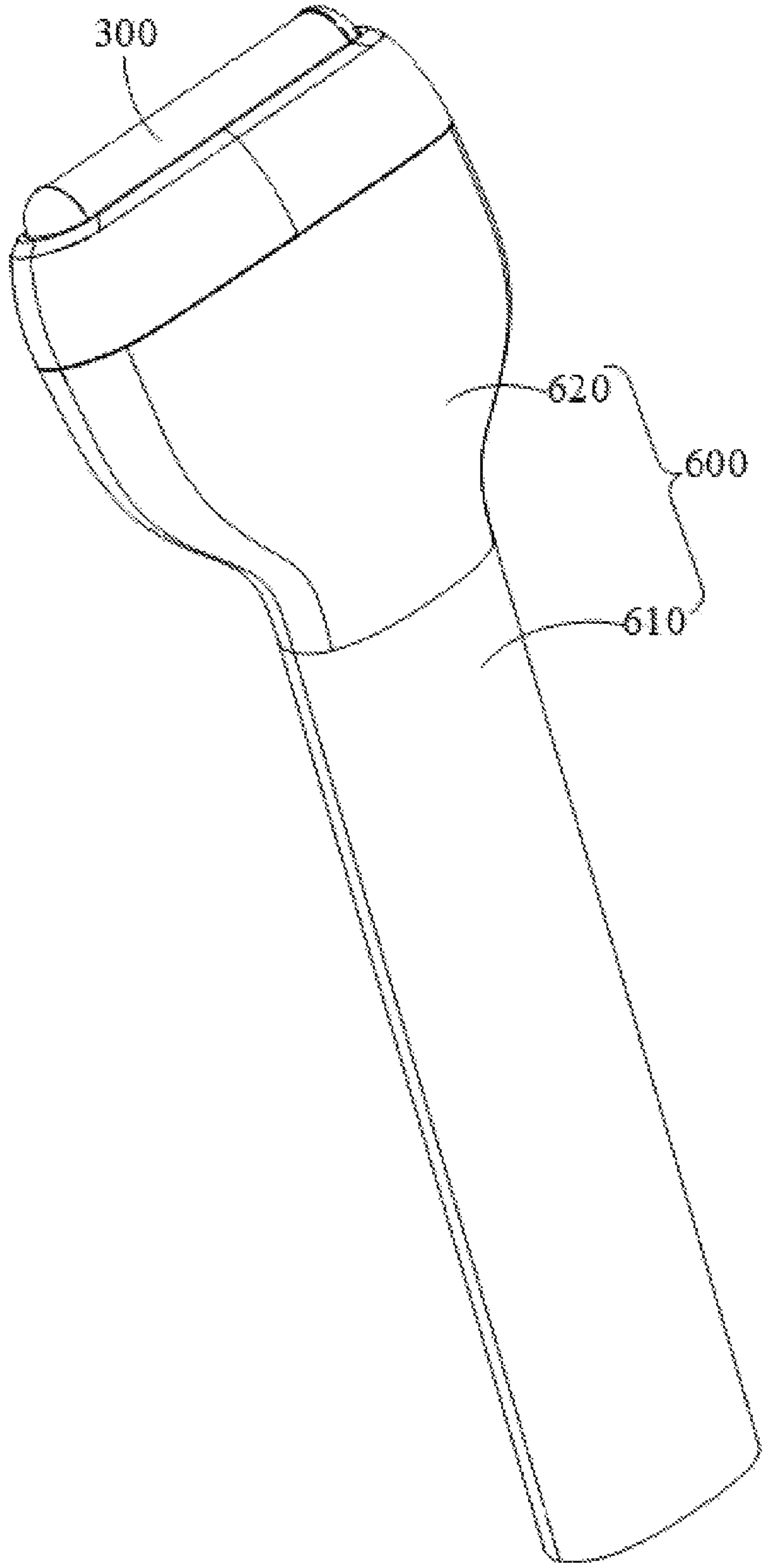
FIG. 1 is a structural schematic view of an electric shaver according to an embodiment of the present disclosure.

| No. | Name |
|---|---|
| 100 | handle |
| 110 | bracket body |
| 111 | suspension space |
| 112 | limiting protrusion |
| 113 | position avoidance hole |
| 114 | recess |
| 120 | vibration damping device |
| 121 | vibration damping oscillator |
| 122 | counterweight block |
| 123 | central shaft |
| 124 | cushioning mechanism |
| 125 | buffer member |
| 126 | plate spring structure |
| 127 | central connection end |
| 128 | positioning jack |
| 129 | external connection end |
| 130 | fastener |
| 131 | connection block |
| 132 | limiting slot |
| 133 | first connector |
| 134 | first spacer |
| 135 | second spacer |
| 200 | driving device |
| 210 | motor housing |
| 220 | motor unit |
| 221 | mover component |
| 222 | stator component |
| 223 | Elastic suspension component |
| 224 | base |
| 230 | elastic support |
| 300 | hair cutting unit |
| 400 | battery |
| 500 | second connector |
| 600 | housing |
| 610 | shank |
| 620 | head |
| 700 | sealing ring |

The realization of the purpose, functional features and advantages of the present disclosure will be further described with reference to the accompanying drawings in conjunction with the embodiments.

DETAILED DESCRIPTION

The technical solutions in the embodiments of the present disclosure will be clearly and completely described below in conjunction with the accompanying drawings in the embodiments of the present disclosure. Obviously, the described embodiments are only a part of the embodiments of the present disclosure, and not all of them. Based on the embodiments in the present disclosure, all other embodiments obtained by those skilled in the art without creative labor fall within the scope of the present disclosure. In addition, the technical solutions among the embodiments may be combined with each other, but only on the basis that the those skilled in the art can realize them. When the combination of technical solutions appears to be contradictory or cannot be realized, it shall be considered that such combination of technical solutions does not exist and is not within the scope claimed by the present disclosure.

In addition, when there is a description involving "first", "second", etc. in the embodiments of the present disclosure, the description of "first", "second", etc. is used only for descriptive purposes and is not to be understood as indicating or implying its relative importance or implicitly specifying the number of technical features indicated. Therefore, features defined with "first" and "second" may explicitly or implicitly include at least one such feature. In addition, the meaning of "and/or" as it appears throughout the text is to include three parallel solutions, for example, "A and/or B", including solution A, or solution B, or solution A and B meet at the same time.

The present disclosure proposes an electric shaver.

In some embodiments of the present disclosure, referring to FIGS. 1 to 4, the electric shaver includes a handle 100, and a driving device 200 and a hair cutting unit 300 disposed at a top of the handle 100; where the driving device 200 includes a motor housing 210, an elastic support 230, and a motor unit 220 disposed in the motor housing 210; the motor unit 220 includes a base 224, a mover component 221, a stator component 222, and an elastic suspension component 223. The stator component 222 is fixedly arranged on the base 224, and the motor unit 220 is suspended in the motor housing 210 by the elastic support 230. An end of the elastic suspension component 223 is fixedly connected to the base 224 and the other end of the elastic suspension component 223 is fixedly connected to the mover component 221, such that the mover component 221 is spaced apart from the stator component 222; the base 224 is suspended and connected to the motor housing 210 through the elastic support 230; the stator component 222 is capable of driving the mover component 221 to move reciprocally in a predetermined direction by electromagnetic action; the mover component 221 is connected to the hair cutting unit 300 to drive the hair cutting unit 300 to cut hair.

The handle 100 includes a bracket body 110 and a vibration damping device 120, and the motor housing 210 is fixedly connected to a top of the bracket body 110; the vibration damping device 120 includes a vibration damping oscillator 121 and a cushioning mechanism 124, and the vibration damping oscillator 121 is suspended and fixedly connected to the bracket body 110 through the cushioning mechanism 124 to absorb an angular vibration of the handle 100 triggered by the driving device 200.

In some embodiments, it is understood that the electric shaver may further include a housing 600. The housing 600 includes a shank housing 610 and a head housing 620 connected to a top of the shank housing 610, the driving device 200 is disposed in the head housing 620, and the motor housing 210 and the housing 600 may be fixedly connected by means of screws, etc.; the handle 100 is arranged in the shank housing 610. The user can use the electric shaver by gripping the shank housing 610 of the housing 600. The overall shape of the handle 100 may be many, for example, the handle 100 may be in an elongated structure, or a block structure, a cylindrical structure, etc. The structure and form of the elastic support 230 and elastic suspension component 223 may be many, for example, the elastic support 230 and elastic suspension component 223 may be a metal shrapnel structure, or a rubber or plastic structure with a certain support strength and elastic return force. The motor housing 210 provides support and mounting for the base 224, the stator component 222, the mover component 221, and other structures. Generally, in order to ensure the support and rebound smoothness, the elastic support 230 and the elastic suspension member are arranged in two sets. That is, each end of the mover component 221 in the predetermined direction is fixedly connected to the base 224 by a set of elastic suspension component 223; each end of the base 224 in the predetermined direction is fixedly connected to the motor housing 210 by a set of elastic support 230.

The hair cutting unit 300 may have many structures, for example, it may be a long whisker knife head, a short whisker knife head, a long whisker and a short whisker hybrid knife head, etc. Different structures and forms of the hair cutting unit 300 may be selected and designed according to actual needs. The mover component 221 may specifically include a permanent magnet and a magnet mount, with the permanent magnet fixed to the magnet mount and each of two ends of the magnet mount connected to the bracket through a set of elastic suspension component 223, respectively. The stator component 222 specifically includes an iron core, a winding frame, and a coil, with the coil wound on the winding frame and arranged on the iron core through the winding frame. The iron core may be a U-shaped core, E-shaped core, etc. Different types of iron cores may be selected according to actual needs, and no specific limitation is made herein.

After the coil of the stator component 222 passes alternating positive and negative currents, the stator component 222 forms an electromagnet. Through the magnetic induction of the electromagnet and the permanent magnet, and the elastic return effect of the two elastic suspension components 223, the stator component 222 drives the mover component 221 to move reciprocally in the predetermined direction. The hair cutting unit 300 is arranged on the magnet mount of the mover component 221, and the formed reciprocating magnetic levitation linear motor can drive a movable knife of the electric shearing device for rapid reciprocal movement.

The stator component 222 may be arranged in only one set, in which case the mover component 221 may be arranged in only one set two sets. When the reciprocating magnetic levitation linear motor has only one mover component 221, the hair cutting unit 300 may include a movable knife head and a static knife head, such that the movable knife head is connected to the mover component 221 of the reciprocating magnetic levitation linear motor, and the movable knife head is driven by the reciprocating magnetic levitation linear motor to move reciprocally relative to the static head to achieve shearing.

When the stator component 222 is arranged in only one set and the mover component 221 is arranged in two sets, such that the permanent magnets of the two sets of mover components 221 have opposite magnetic poles. In this way, the set of stator component 222 can drive the two sets of mover components 221 in opposite directions of reciprocating motion. Of course, the stator component 222 may be arranged in two or more sets. When the stator component 222 is arranged in two sets, the mover component 221 may also be arranged in two sets, and each set of mover component 221 is arranged above a corresponding stator component 222. The two sets of stator components 222 each drive the corresponding mover component 221 to reciprocate in the opposite direction respectively. The specific number of stator components 222 and mover components 221 is not limited here, but may be selected and designed according to the specific type of reciprocating magnetic levitation linear motor. When the reciprocating magnetic levitation linear motor has two mover components 221, the hair cutting unit 300 may include two movable knife heads, and the two movable knife heads are respectively connected to the two mover components 221, then the reciprocating magnetic levitation linear motor drives the two movable knife heads to conduct the reverse reciprocating motion respectively to achieve shearing.

It should be noted that when there are directional indications (such as up, down, left, right, forward, back . . . ) involved in the embodiments of the present disclosure, the directional indications are only intended to explain the relative position relationship, movement, etc. between the components in a particular attitude. When the particular attitude is changed, the directional indications are changed accordingly. In this specification, the electric shaver is set up with a side with the hair cutting unit 300 as a top and the end of the handle 100 as a bottom, when the electric shaver is in use.

Each end of the mover component 221 is connected to the base 224 by a set of elastic suspension component 223, and the mover component 221 is spaced apart from the stator component 222 by the elastic suspension component 223. In some embodiments, the mover component 221 may be suspended above the stator component 222 by the elastic suspension component 223, i.e., both the hair cutting unit 300 and the mover component 221 are disposed above the stator component 222. Of course, in other embodiments, the mover component 221 may be suspended below the stator component 222 by the elastic suspension component 223, the base 224 is disposed above the stator component 222, and the hair cutting unit 300 is arranged on the base 224, i.e., the hair cutting unit 300 and the mover component 221 are disposed on the upper and lower sides of the stator component 222, respectively. The specific positions of the mover component 221, the stator component 222, and the hair cutting unit 300 are not limited herein, as long as the stator component 222 can drive the mover component 221 to move reciprocally in the predetermined direction and drive the movable knife of the hair cutting unit 300 to achieve cutting hair.

It should be noted that angular vibration means that the mass only vibrates around the axis. When the reciprocating magnetically levitated linear motor is in operation, especially when both the hair cutting unit 300 and the mover component 221 are arranged above the stator component 222, the stator component 22 moves in a straight line in the predetermined direction, causing the entire driving device 200 to oscillate around the center of mass of the mover component 221 in a longitudinal plane. The vibration of the driving device 200 is transmitted to the handle 100, triggering the angular vibration of the handle 100, making the vibration of the handle 100 particularly strong. When the user grips the handle 100, the vibration is strong and the experience is poor. By setting the elastic suspension component 223, the base 224 is suspended and connected to the motor housing 210 by the elastic support 230, the vibration of the mover component 221 is first transmitted to the base 224 through the elastic suspension component 223, absorbed mostly by the stator component 222 on the base 224, transmitted to the elastic support 230 for further absorption, and finally transmitted to the motor housing 210. In this way, most of the vibration of the entire driving device 200 is absorbed and cushioned by the stator component 222 and the elastic support 230, which can effectively weaken the vibration of the housing as a whole. Since one end of the elastic support 230 is connected to the base 224 and the other end is connected to the motor housing 210, the weight of the base 224 and the stator component 222 is much greater than the weight of the mover component 221 and the hair cutting unit 300 compared to a solution in which the elastic support 230 is connected to the mover component 221 at one end and the motor housing 210 at the other end, which makes the initial acceleration of the mover component 221 to the elastic support 230 less. In this way, the swing of the elastic support 230 relative to the motor housing 210 is smaller, which is more conducive to vibration damping.

The motor housing 210 may be fixedly connected to the bracket body 110 by means of plugging, screw connection, snap connection, etc. The vibration damping oscillator 121 may specifically include a counterweight block 122, etc. The structure of the cushioning mechanism 124 may be many, for example, the cushioning mechanism 124 may be one or more combinations of shrapnel, spring, damper, to achieve a certain amount of cushioning damping, and the structure of the cushioning mechanism 124 is not specifically limited herein. There are also many ways to connect the cushioning mechanism 124 to the mounting body, for example, the cushioning mechanism 124 and the mounting body may be connected by screws, snap connections, welding, etc. The mounting position of the vibration damping device 120 may be many, for example, the vibration damping device 120 may be placed at an end of the handle 100, the middle of the handle 100, etc. The vibration damping oscillator 121 is suspended and fixedly connected to the bracket body 110 through the cushioning mechanism 124, to absorb the vibration of the handle 100 along the predetermined direction, and the vibration damping device 120 is equivalent to a shock absorber. In actual use, the vibration damping oscillator 121 is not in direct contact with the bracket body 110, but is elastically connected to the bracket body 110 through the cushioning mechanism 124. The vibration damping oscillator 121 oscillates reciprocally in the predetermined direction, the oscillation direction of the vibration damping oscillator 121 is opposite to the reciprocal motion direction of the mover component 221, and the inherent frequency of the vibration damping device 120 is approximately equal to the inherent frequency of the driving device 200, thereby absorbing the angular vibration transmitted to the handle 100 by the driving device 200. The electric shaver of the present disclosure is more comfortable to use, especially under high frequency vibration.

In the electric shaver of the present disclosure, one end of the elastic suspension component 223 is fixedly connected to the base 224 and the other end is fixedly connected to the mover component 221, such that the mover component 221 is spaced apart from the stator component 222; the base 224 is suspended from the motor housing 210 by the elastic support 230. In this way, the mover component 221 is connected to the base 224 through the elastic suspension component 223, and the base 224 is connected to the motor housing 210 through the elastic support 230, which makes full use of the weight of the stator component 222 on the base 224 to achieve cushioning and vibration damping, such that the swing of the elastic support 230 relative to the motor housing 210 is smaller, and the vibration amplitude transmitted to the motor housing 210 is smaller.

In addition, the handle 100 includes the bracket body 110 and the vibration damping device 120, and the motor housing 210 is fixedly connected to the top of the bracket body 110; the vibration damping device 120 includes the vibration damping oscillator 121 and the cushioning mechanism 124, and the vibration damping oscillator 121 is suspended and fixedly connected to the bracket body 110 through the cushioning mechanism 124 to absorb the vibration of the handle 100 along the predetermined direction. In this way, the vibration damping device 120 is arranged on the bracket body 110 of the handle 100, such that the vibration damping oscillator 121 is suspended and fixedly connected to the bracket body 110 through the cushioning mechanism 124 to absorb the angular vibration of the handle 100 and further reduce the vibration transmitted to the handle 100 by the driving device 200. Thus, the driving device 200 of the electric shaver of the present disclosure achieves primary vibration damping through the elastic support 230, and the handle 100 achieves secondary vibration damping through the vibration damping device 120, which can effectively weaken the vibration of the entire handle 100 and make the electric shaver feel better in use.

Figure 2:
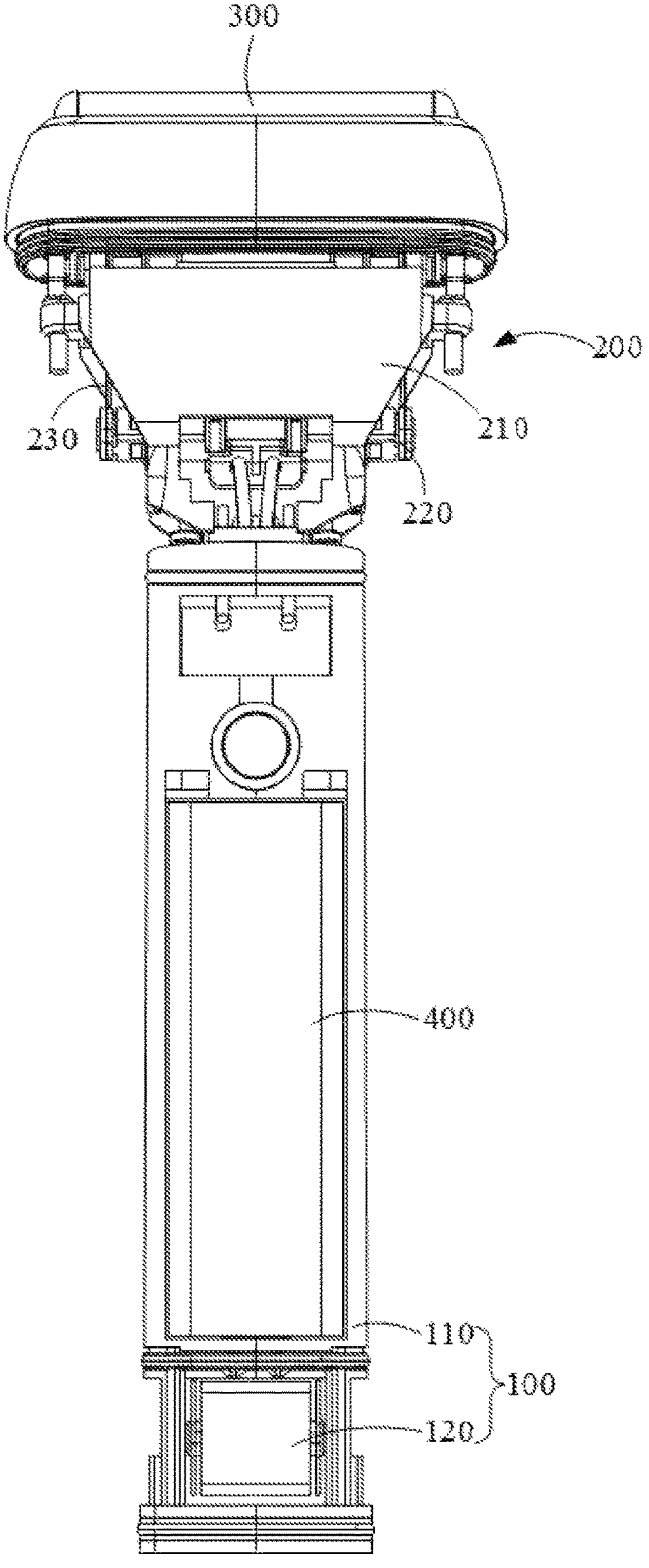
FIG. 2 is a structural schematic view of the electric shaver in FIG. 1 with a housing removed.
Figure 3:
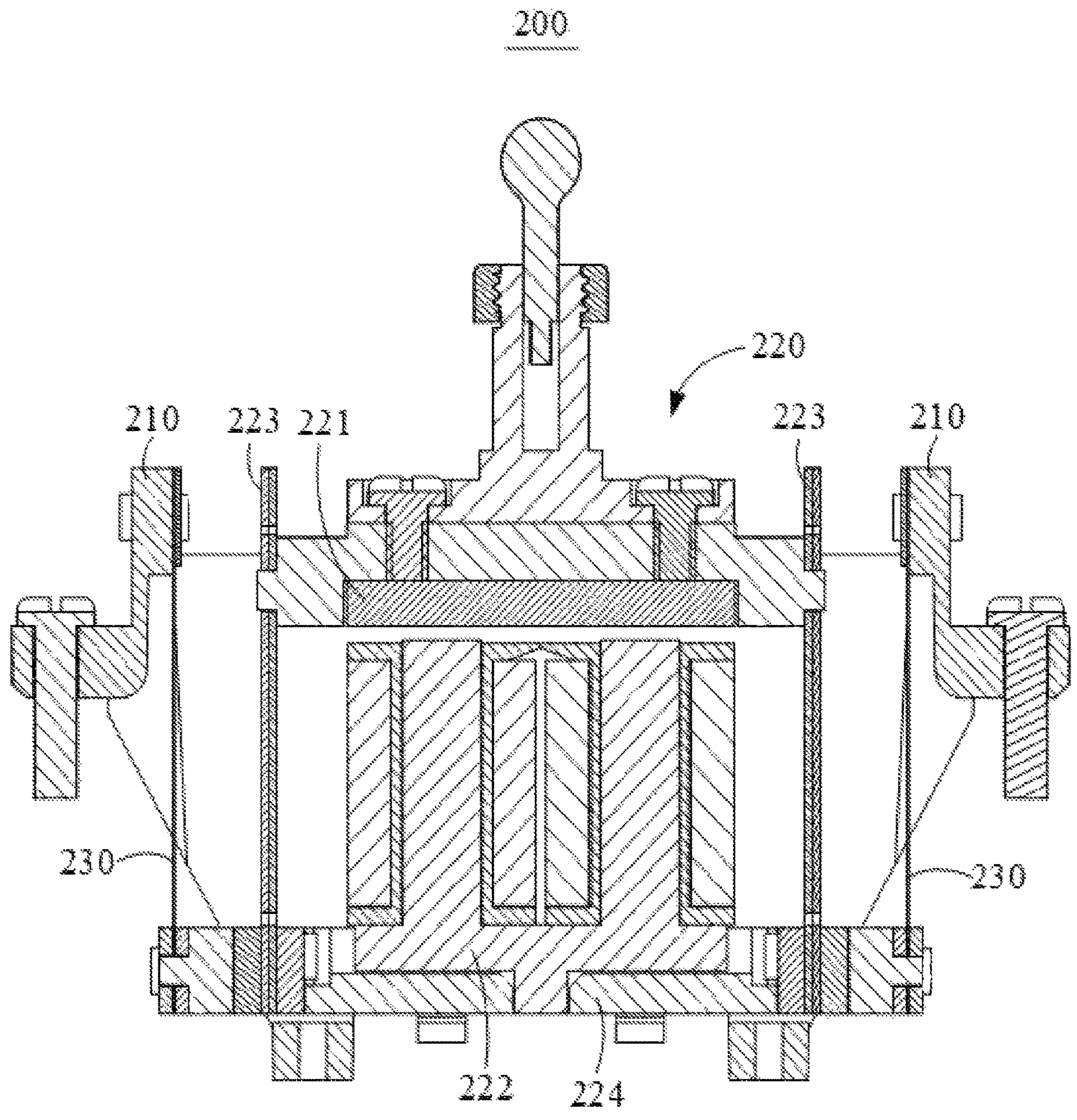
FIG. 3 is a cross-sectional view of a driving device in FIG. 2 at an angle.
Figure 4:
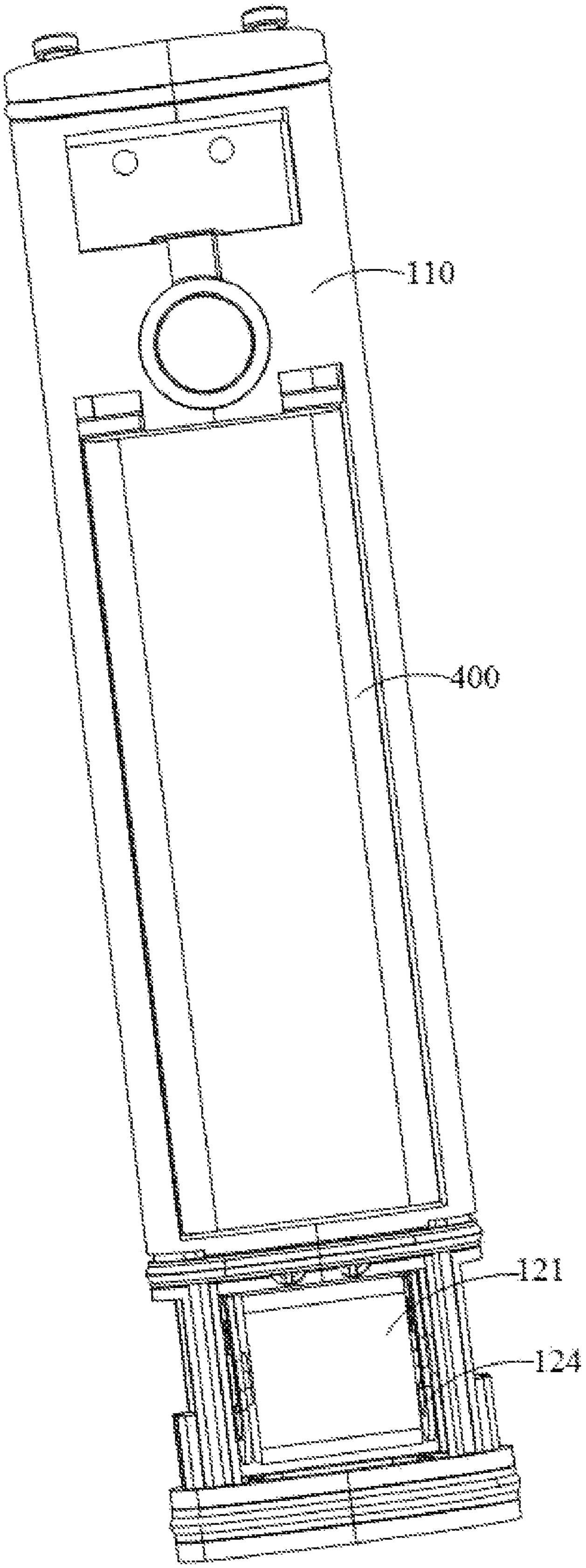
FIG. 4 is a schematic view of a structure with a handle and a battery assembled in FIG. 2.
Figure 5:
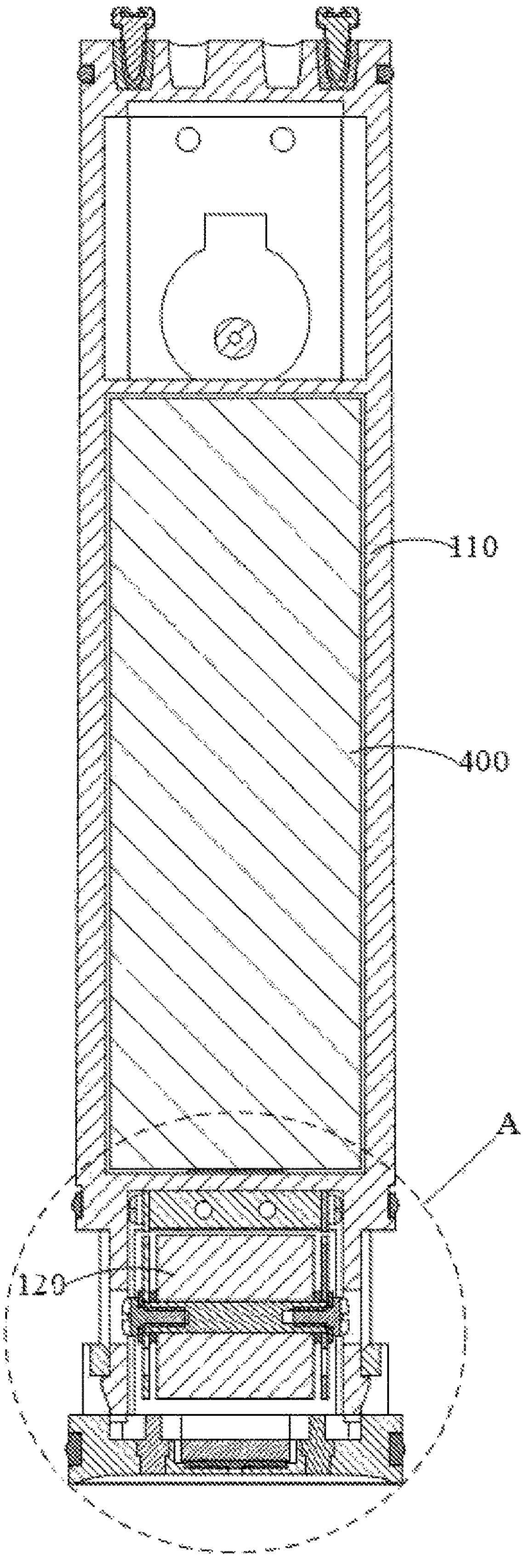
FIG. 5 is a cross-sectional view of a structure in FIG. 4 at an angle.
Figure 6:
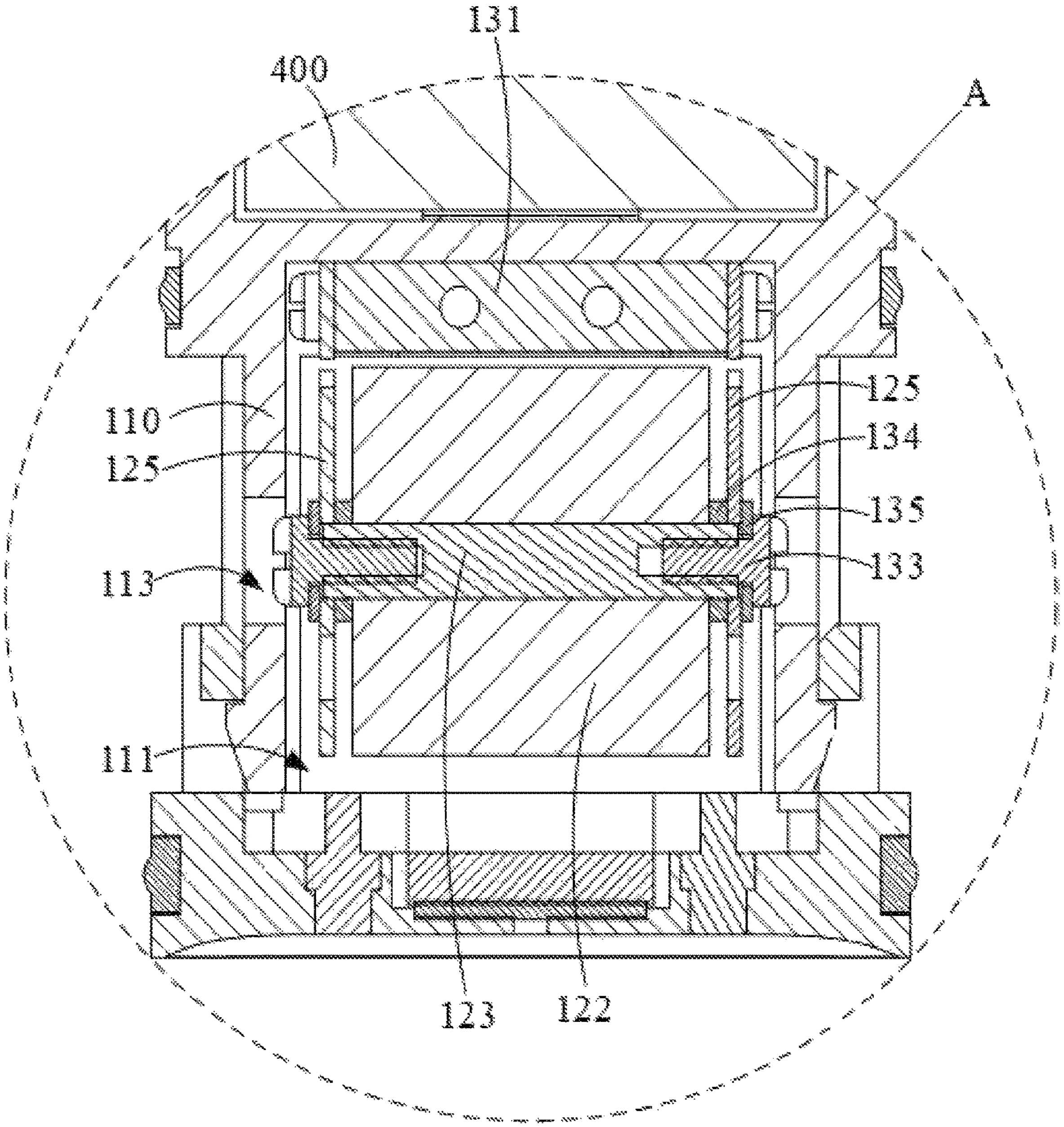
FIG. 6 is a partial enlarged view at A in FIG. 5.
Figure 7:
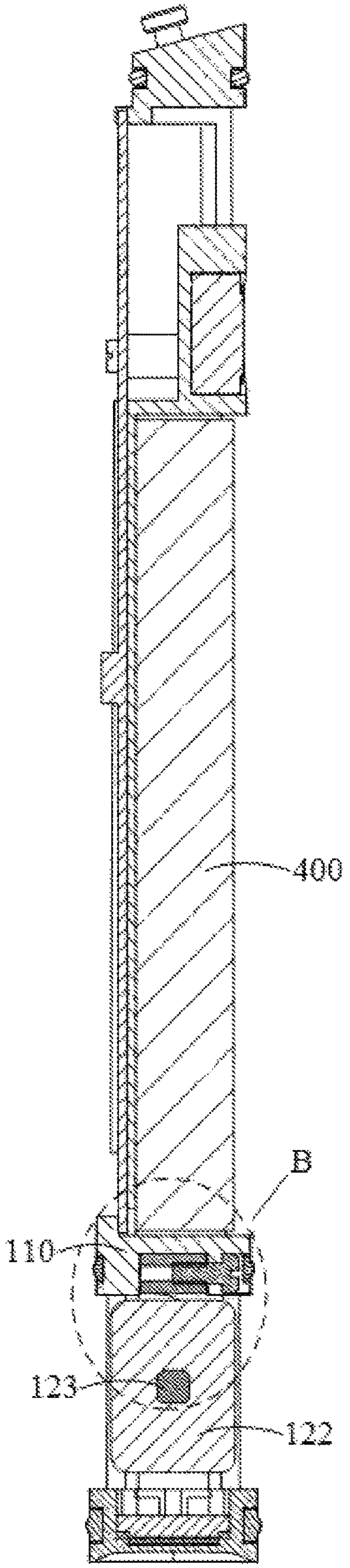
FIG. 7 is a cross-sectional view of a structure in FIG. 4 at another angle.
Figure 8:
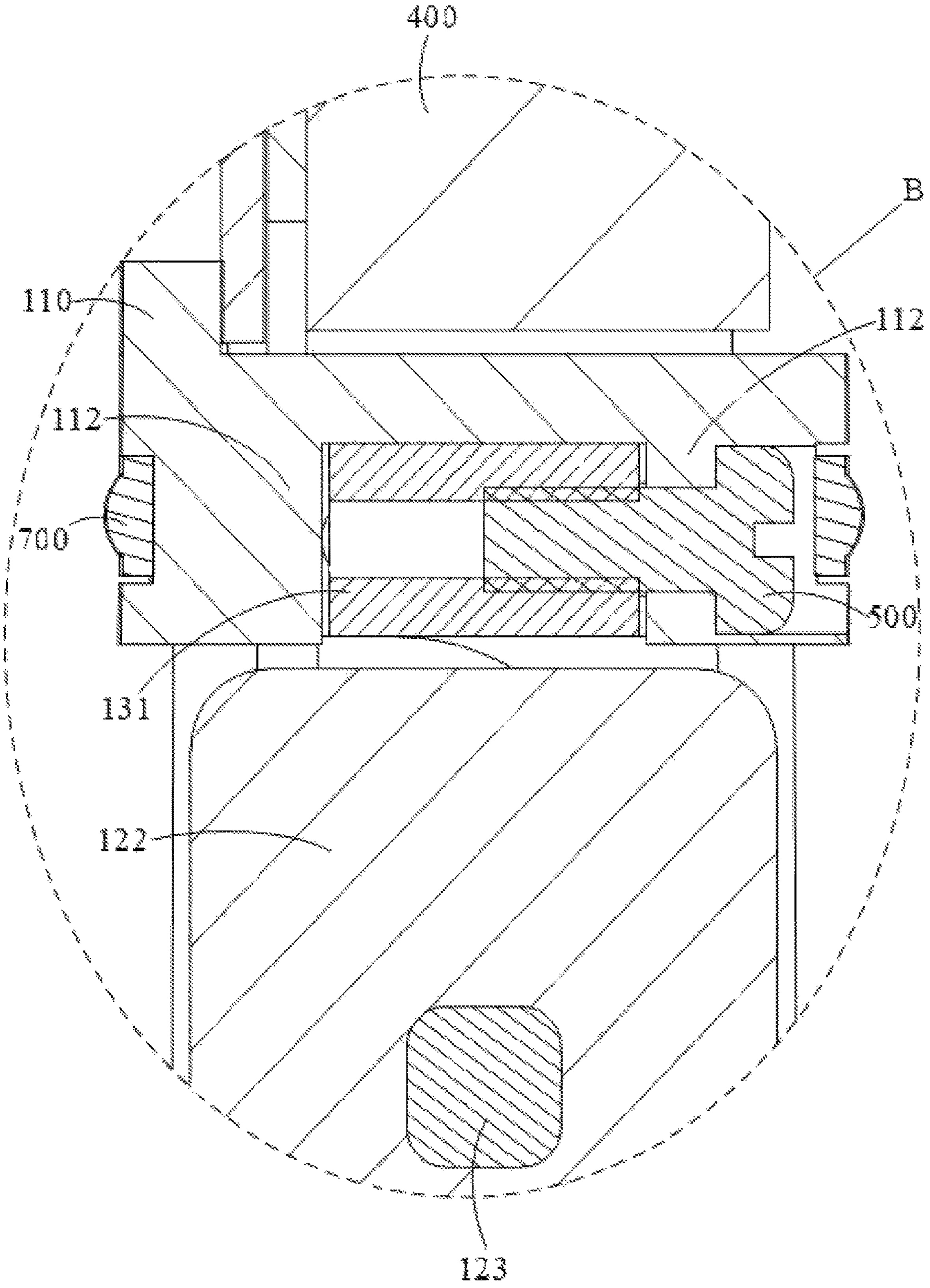
FIG. 8 is a partial enlarged view at B in FIG. 7.
Figure 9:
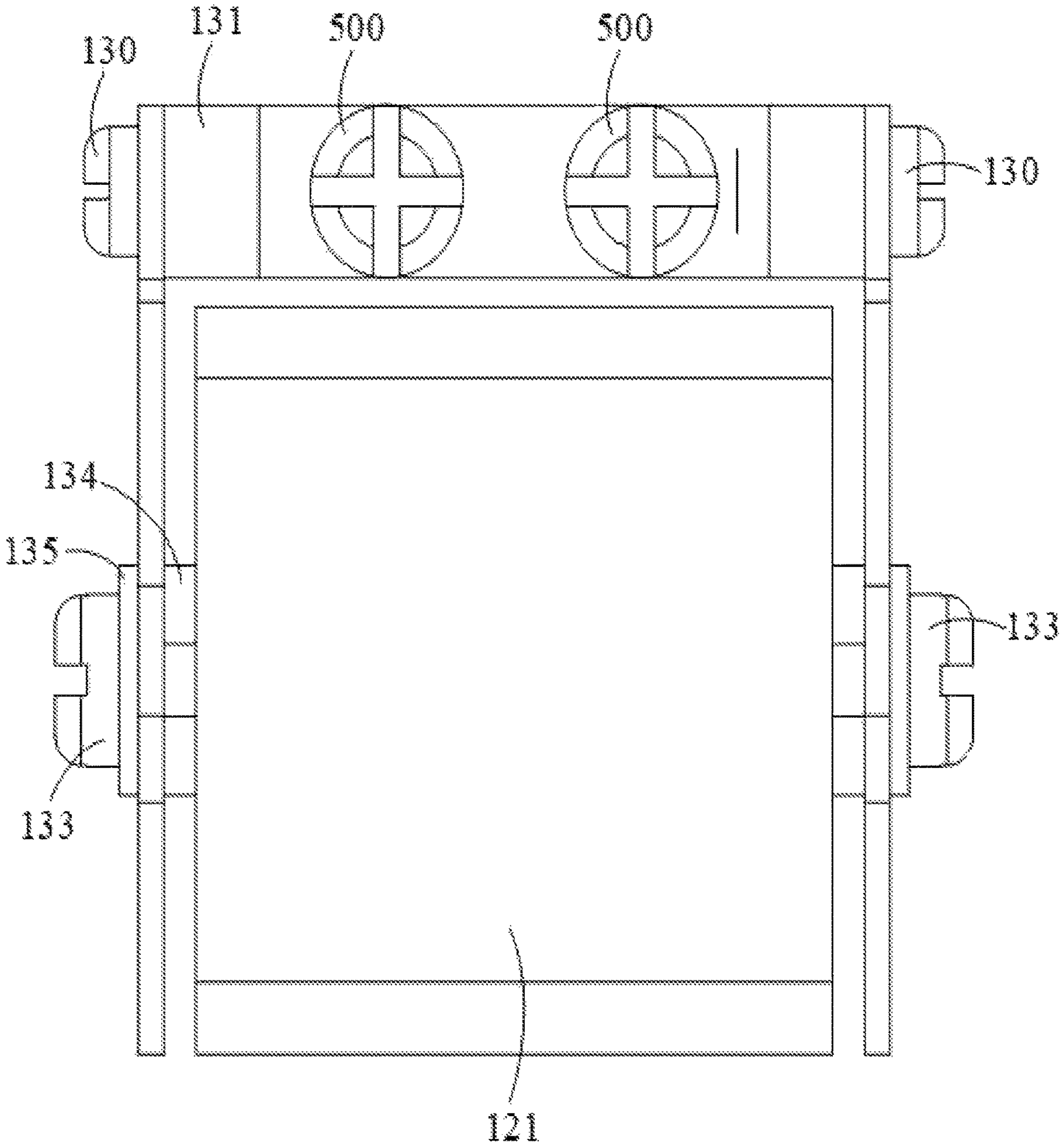
FIG. 9 is a structural schematic view of a vibration damping device according to an embodiment of the present disclosure.

In some embodiments, as shown in FIG. 2, FIG. 4, and FIG. 5, the bracket body 110 is in the shape of an elongated strip extending up and down, and the vibration damping device 120 is arranged at an end of the bracket body 110 away from the driving device 200.

In some embodiments, the bracket body 110 is configured to be along the long strip extending up and down, and the cross-sectional shape of the bracket body 110 may be many, such as round, oval, rectangular, polygonal, shaped, etc., without making specific limitation herein. To have sufficient mounting space and to facilitate the user's grip, the handle 100 of the shaver is usually in the shape of an elongated strip. It is understood that since the driving device 200 is fixedly connected to the top of the bracket body 110, and the bracket body 110 is in the shape of a long strip extending up and down, when the vibration of the driving device 200 is transmitted to the handle 100, the vibration at the end of the handle 100 (the end away from the driving device 200) is particularly strong. Therefore, by making the vibration damping device 120 disposed at the end of the bracket body 110 away from the driving device 200, the vibration of the handle 100 can be weakened to the maximum extent, further improving the comfort of use.

Further, the electric shaver further includes a battery 400, which is embedded in the bracket body 110 and disposed between the vibration damping device 120 and the driving device 200. Specifically, the electric shaver further includes a circuit board and a conductive structure, the circuit board being electrically connected to the battery 400 through the conductive structure, and the circuit board being connected to the coil of the stator component 222 through a wire for providing current to the stator component 222. The conductive structure may be a wire or other electrically connected structure that allows charging of the battery 400 by an external power source. The battery 400 is embedded in the bracket body 110 and disposed between the vibration damping device 120 and the driving device 200, such that the battery 400 can increase the weight of the handle 100, which may reduce the vibration to a certain extent. The vibration damping device 120 is arranged at an end of the battery 400 away from the driving device 200, such that the bracket body 110 is basically disposed at the very end of the bracket body 110, and the vibration damping device 120 further has a better damping effect. In addition, the space under the battery 400 is fully utilized to arrange the vibration damping device 120, making the overall structure more compact.

In some embodiments, referring to FIG. 2, FIG. 4 to FIG. 8, the bracket body 110 defines a suspension space 111, and the cushioning mechanism 124 includes two buffer members 125, and each end of the vibration damping oscillator 121 in the predetermined direction is fixedly connected to the bracket body 110 through a corresponding buffer member 125 to be suspended in the suspension space 111.

In the embodiments, the structure of the buffer member 125 may be many, for example, the buffer member 125 may be a plate spring structure, or a cylindrical spring, etc., as long as it can achieve a certain degree of buffering, here not to make specific limitations. By defining the suspension space 111 on the bracket body 110, the vibration damping oscillator 121 is embedded in the suspension space 111, which does not increase the thickness of the handle 100. It is understood that the volume of the suspension space 111 is greater than the volume of the whole vibration damping device 120. Each end of the vibration damping oscillator 121 in the predetermined direction is fixedly connected to the bracket body 110 through a corresponding buffer member 125, such that the buffer members 125 can make the vibration damping oscillator 121 swing back and forth in the predetermined direction, and thus can achieve the absorption of the vibration of the handle 100 in the predetermined direction.

Figure 10:
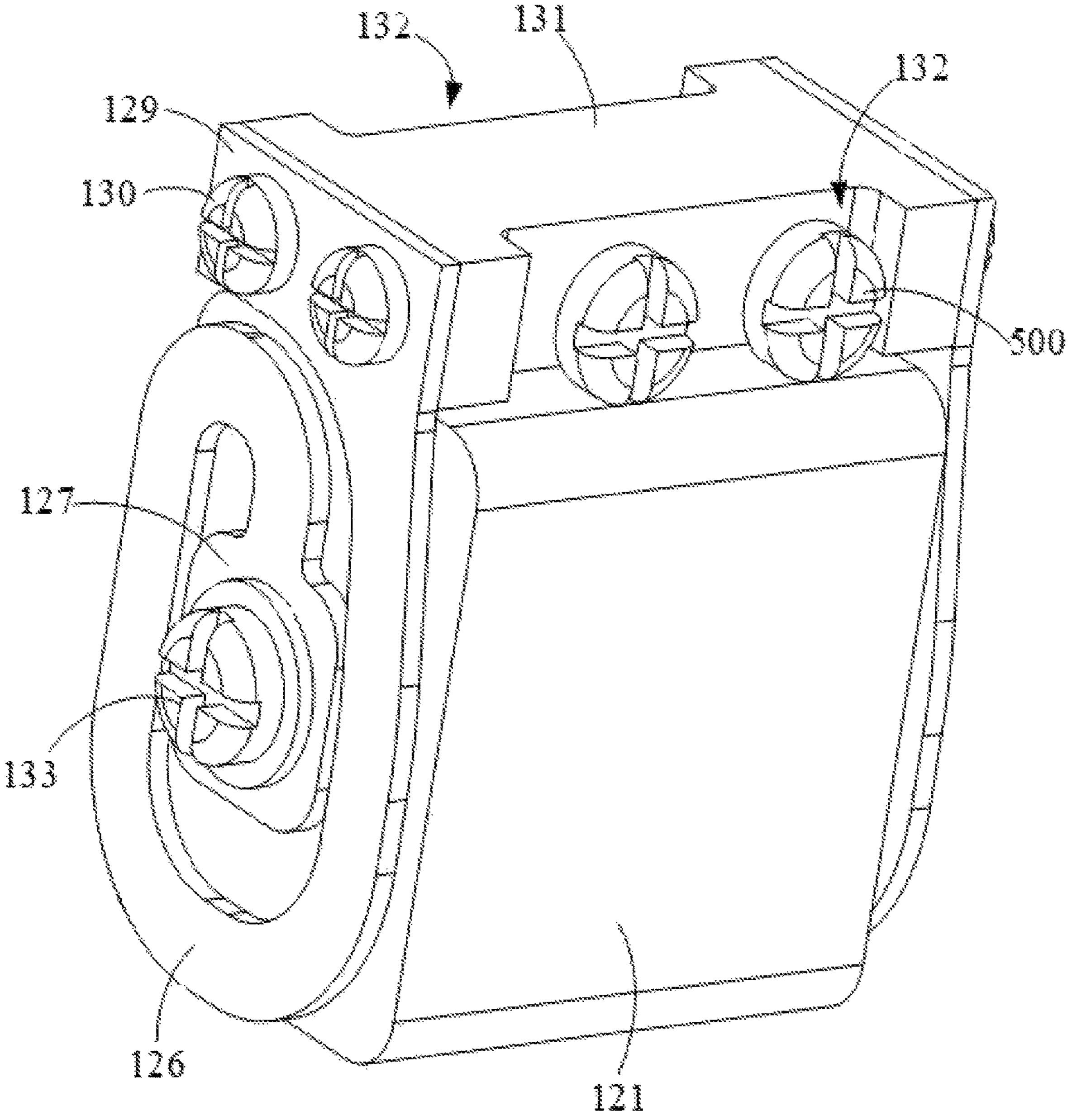
FIG. 10 is a structural schematic view of a vibration damping device in FIG. 7 at another angle.
Figure 11:
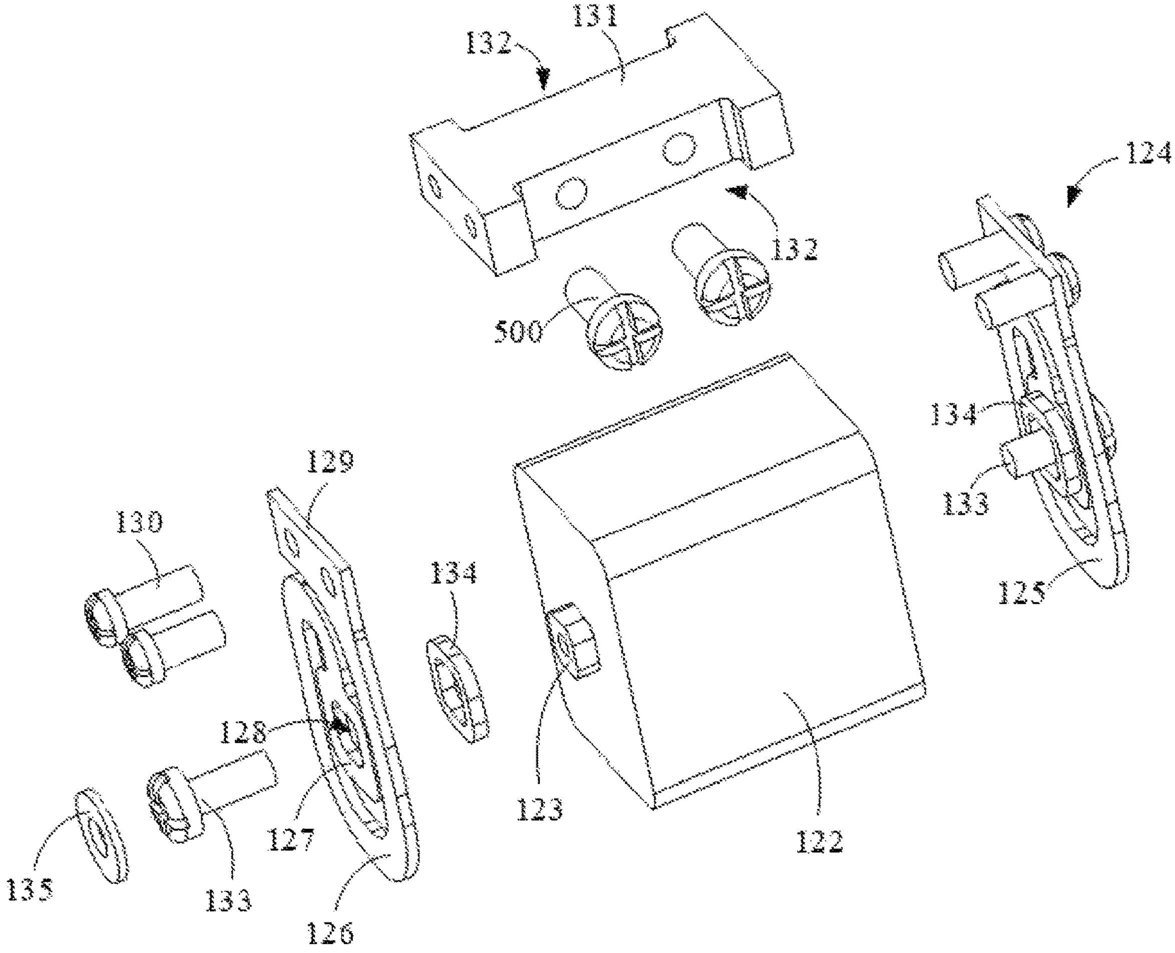
FIG. 11 is an exploded structural schematic view of a vibration damping device in FIG. 8.

Further, as shown in FIG. 10 and FIG. 11, the buffer member 125 includes at least one disc-shaped extended plate spring structure 126, a central connection end 127 of the plate spring structure 126 is fixedly connected to an end of the vibration damping oscillator 121 in the predetermined direction, and an external connection end 129 of the plate spring structure 126 is fixedly connected to the bracket body 110.

In some embodiments, the plate spring structure 126 is a sheet mechanism. The plate spring structure 126 has a structure that is coiled from the center outward, and the plate spring shrapnel may be coiled in a mosquito shape, or in a runway shape, etc., without any specific limitation herein. The buffer member 125 may include only one plate spring structure 126 or may include two or more laminated or spaced plate spring structures 126, and the number of the plate spring structures 126 may be selected according to actual needs, without any specific limitation herein. The central connection end 127 of the plate spring shrapnel refers to a beginning of the center coiling, and the external connection end 129 of the plate spring structure 126 refers to an end of the outer coiling. The central connection end 127 of the plate spring structure 126 and the vibration damping oscillator 121 may be fixedly connected by means of screws, welding, etc. The external connection end 129 of the plate spring structure 126 may be screwed, welded, etc. to the bracket body 110. By making the plate spring structure 126 in a centered coiled shape, an elastic arm of the plate spring structure 126 may be longer compared to other structures, which can provide sufficient elasticity and support to the vibration damping oscillator 121 with the same occupied space. In other words, the embodiments of the plate spring structure 126 can ensure sufficient elasticity and support while making the space occupied smaller, such that the overall size of the vibration damping device 120 is smaller.

In some embodiments, as shown in FIGS. 5 to 11, the vibration damping device 120 further includes a connection block 131 fixedly connected to the bracket body 110; the external connection ends 129 of the two buffer members 125 are fixedly connected to two ends of the connection block 131, and the connection block 131 is spaced apart from the vibration damping oscillator 121.

In some embodiments, the connection block 131 and the bracket body 110 may be fixedly connected by screwing, embedding, riveting, welding, and other means. The connection block 131 may be disposed above, below, in front of, behind, etc. of the vibration damping oscillator 121, without any specific limitation herein. The vibration damping device 120 further includes the connection block 131, and the external connection ends 129 of the two buffer members 125 are fixedly connected to the two ends of the connection block, such that the vibration damping oscillator 121, the two buffer members 125, and the connection block 131 may be connected into a module. In this way, when arranging the vibration damping device 120, only the connection block 131 is required to be arranged in the bracket body 110 to realize the connection between the vibration damping device 120 and the bracket body 110, making the installation of the vibration damping device 120 more convenient and fast. The connection block 131 is spaced apart from the vibration damping oscillator 121, such that the connection block 131 will not affect the movement of the vibration damping oscillator 121 and thus will not affect the vibration damping effect of the vibration damping device 120. The connection block 131 and the external connection end 129 of the buffer member 125 may be fixedly connected by welding, riveting, screwing, and other means. To facilitate the disassembly of the connection block 131 and the buffer member 125, in some embodiments, the external connection ends 129 of the two buffer members 125 are connected to the connection block 131 by at least one fastener 130. Of course, the fastener 130 may also be a bolt, rivet structure, etc.

In some embodiments, referring again to FIGS. 5 to 11, the vibration damping oscillator 121 includes a counterweight block 122 and a central shaft 123. The central shaft 123 is threaded and limited around its axis to be arranged at the counterweight block 122, and two ends of the central shaft 123 are fixedly connected to the two central connection ends 127.

In some embodiments, the cross-section of the central shaft 123 is non-circular, and the counterweight block 122 has a mounting channel adapted to the central shaft 123. The central shaft 123 penetrates the mounting channel of the counterweight block 122 and goes through an outer wall surface of the central shaft 123 and an inner wall surface of the mounting channel of the counterweight block 122, such that the central shaft 123 and the counterweight block 122 are limited in the axis around the central shaft 123, and the central shaft 123 may be prevented from rotating relative to the counterweight block 122, and the deviation of the counterweight block 122 from the trajectory of movement can be avoided. The counterweight block 122 may specifically be a metal block. The shape of the counterweight block 122 may be many, for example, the cross-sectional shape of the counterweight block 122 may be rectangular, round, oval, special-shaped, etc., without making specific limitations herein. The two ends of the central shaft 123 are respectively fixedly connected to the central connection end 127, that is, the counterweight block 122 is fixed to the plate spring structure 126 through the central shaft 123, which can effectively reduce the installation error and ensure the weight balance of the counterweight block 122 in the predetermined direction, compared with making the central connection end 127 of the plate spring structure 126 directly fixedly connected to the counterweight block 122, such that the counterweight block 122 has the same vibration absorption amplitude in the predetermined direction, and the situation of strong vibration on one side and weak vibration on the other side may be avoided. In addition, since the vibration of the buffer member 125 is first transmitted to the connection between the central connection end 127 and the central shaft 123, which makes the central shaft 123 easily damaged, it is cheaper to replace the central shaft 123 compared with the counterweight block 122.

In some embodiments, as shown in FIG. 5, FIG. 6, FIG. 9 to FIG. 11, the central connection end 127 is arranged with a positioning jack 128, and the central shaft 123 is inserted in the positioning jack 128; the vibration damping device 120 further includes a first connector 133, and the first connector 133 penetrates the positioning jack 128 and an end of the central shaft 123 to be fixedly connected to the central connection end 127 and the central shaft 123. The first connector 133 may be a screw. The central shaft 123 is adapted to be inserted into the positioning jack 128 to achieve a pre-positioning of the plate spring structure 126 and the central shaft 123, thus it is more convenient for the subsequent screw connection. The first connector 133 is fixedly connected to a center connecting section of the plate spring structure 126 and the central shaft 123 through the positioning jack 128 of the center connection end to achieve a detachable connection between the plate spring structure 126 and the central shaft 123, and it is more convenient for subsequent maintenance and replacement.

In some embodiments, referring to FIG. 5, FIG. 6, and FIG. 9 to FIG. 11, the two ends of the central shaft 123 protrude from the counterweight block 122, and the vibration damping device 120 further includes a first spacer 134 and a second spacer 135 disposed on both sides of the plate spring structure 126, the first spacer 134 being sleeved on an outer periphery of the central shaft 123 and sandwiched between the central connection end 127 and the counterweight block 122; the second spacer 135 is sandwiched between the first connector 133 and the central connection end 127; the bracket body 110 defines a position avoidance hole 113 facing the first connector 133, and an inner wall surface of the position avoidance hole 113 is disposed at a periphery of an outer peripheral wall of the second spacer 135.

In some embodiments, the first connector 133 is specifically a screw, and the second spacer 135 is sleeved on a rod of the screw and is clamped between the head housing 620 of the screw and the central connection end 127. By arranging the first spacer 134 and the second spacer 135, the first spacer 134 is sandwiched between the central connection end 127 and the counterweight block 122, and the second spacer 135 is sandwiched between the first connector 133 and the central connection end 127, such that the first spacer 134 and the second spacer 135 can effectively avoid the plate spring shrapnel from being attached to the counterweight block 122, and make the connection between the first connector 133, the central connection end 127 of the plate spring shrapnel, and the central shaft 123 more stable and less likely to be loosened. By opening the position avoidance hole 113 in the position of the first connector 133 in the bracket body 110, the inner wall surface of the position avoidance hole 113 is disposed at the periphery of the outer peripheral wall of the second spacer 135, which can effectively avoid the vibration damping device 120 from colliding with the bracket body 110 when it swings in the predetermined direction and further ensure the vibration damping effect of the vibration damping device 120.

Figure 12:
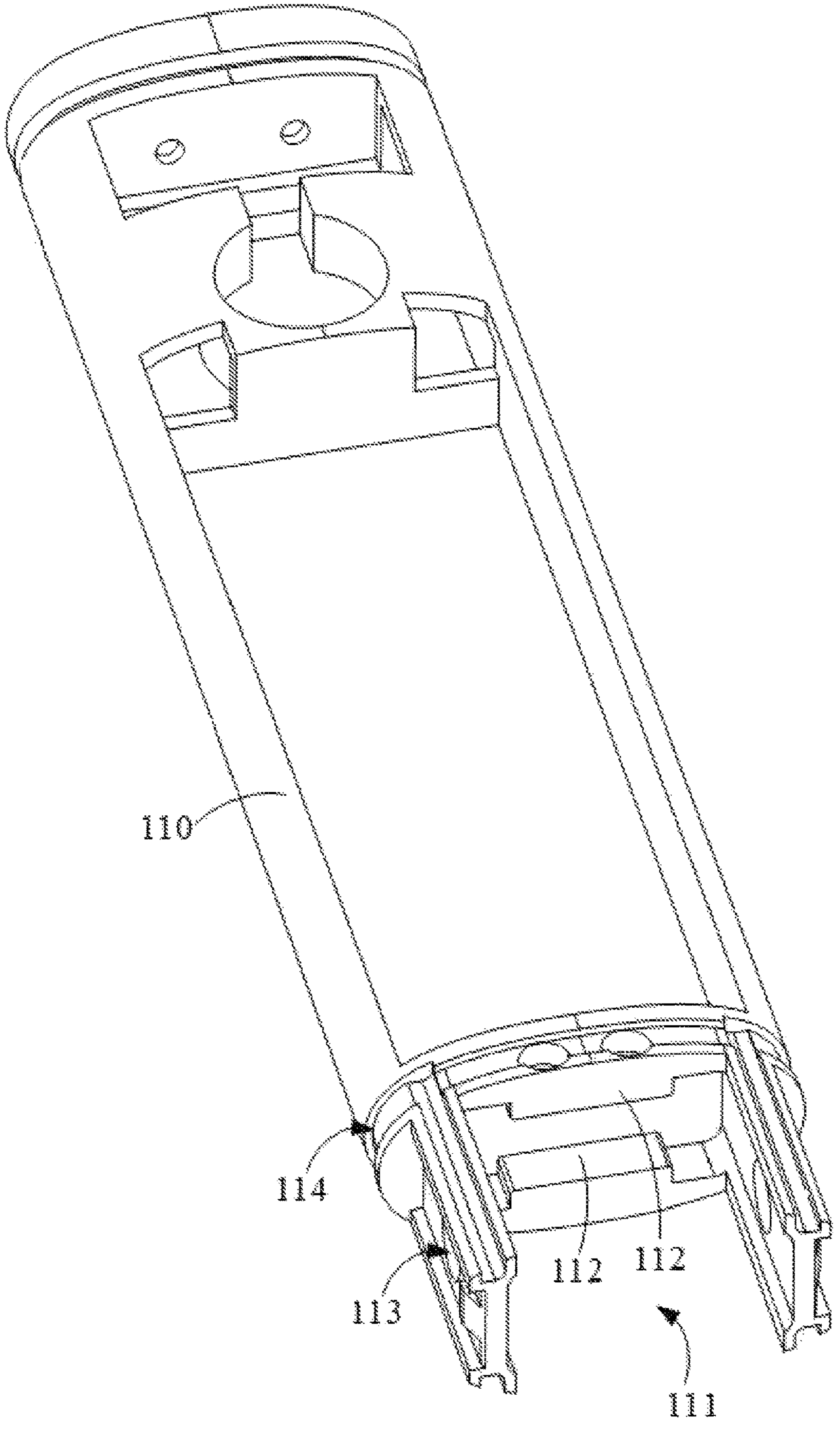
FIG. 12 is a structural schematic view of a support body according to an embodiment of the present disclosure.

In some embodiments, as shown in FIGS. 10 to 12, each of the two opposite side wall surfaces of the connection block 131 extending along the predetermined direction are recessed to define a limiting slot 132; a top wall of the suspension space 111 is arranged with two limiting protrusions 112 that are opposite to each other and spaced apart; the two limiting protrusions 112 are correspondingly embedded in the two limiting slots 132 to limit the movement of the connection block 131 relative to the bracket body 110 in the predetermined direction; the electric shaver further includes a second connector 500, which penetrates the limiting protrusion 112 and is fixedly connected to the bracket body 110 and the connection block 131.

In the embodiments, the two opposing side walls of the connection block 131 are recessed in the predetermined direction to define the limiting slots 132, and the top wall of the suspension space 111 is arranged with the two limiting protrusions 112 that are opposite to each other and spaced apart. During installation, the connection block 131 is embedded in the top of the suspension space 111, and the limiting protrusions 112 of the top wall of the suspension space 111 are inserted in the limiting slots 132 of the connection block 131 to limit the movement of the connection block 131 in the predetermined direction, such that the pre-positioned installation of the connection block 131 and the bracket body 110 can be realized. The second connector 500 may be a screw, rivet, etc. In some embodiments, the second connector 500 is a screw in order to facilitate disassembly and installation. The second connector 500 penetrates the limiting protrusions 112 and is fixedly connected to the bracket body 110 and the connection block 131, making full use of the limiting protrusions 112 to ensure the structural strength of the bracket body 110 and make the connection between the bracket body 110 and the connection block 131 more stable and reliable. The connection block 131 is connected to the top wall of the suspension space 111, such that the entire counterweight block 122 is disposed below the connection block 131, which reduces the influence of gravity on the buffer member 125 and improves the vibration damping effect of the vibration damping device 120 compared to setting the connection block 131 on the bottom wall or side wall of the suspension space 111.

In some embodiments, a difference between the inherent frequency of the vibration damping device 120 and the inherent frequency of the driving device 200 is greater than or equal to −5 HZ and less than or equal to 5 HZ; and/or, the mass of the vibration damping oscillator 121 is positively correlated with the mass of the mover component 221.

In the embodiments, if the absolute value of the difference between the inherent frequency of the vibration damping device 120 and the inherent frequency of the driving device 200 is greater than 5 HZ, the difference between the inherent frequency of the vibration damping device 120 and the inherent frequency of the driving device 200 is too large, the damping effect of the vibration damping device 120 is not obvious. By making the absolute value of the difference between the inherent frequency of the vibration damping device 120 and the inherent frequency of the driving device 200 less than 5 HZ, the vibration damping device 120 can absorb the vibration of the handle 100 to a greater extent, thereby weakening the vibration of the whole machine and improving the user experience.

It is understood that the greater the mass of the mover component 221, the stronger the vibration of the handle 100. By making the mass of the vibration damping oscillator 121 positively correlated with the mass of the mover component 221, i.e., when the mass of the mover component 221 is greater, the mass of the vibration damping oscillator 121 is also set greater, the angular vibration of the handle 100 may be more effectively absorbed. The hair cutting unit 300 includes a movable knife head, and the mover component 221 is connected to the movable knife head to drive the movable knife head to move reciprocally in the predetermined direction. The vibration amplitude of the driving device 200 is related to the sum of the masses of the mover component 221 and the movable knife head. In some embodiments, the mass of the vibration damping oscillator 121 is set positively correlated with the sum of the masses of the mover component 221 and the movable knife head. In this way, the vibration damping effect of vibration damping oscillator 121 may be further improved. Specifically, when the ratio of the mass of the vibration damping oscillator 121 to the sum of the masses of the mover component 221 and the movable knife head is less than 0.9 and greater than 1.1, the vibration amplitude of the vibration damping oscillator 121 differs significantly from the vibration amplitude of the driving device 200, and the overall vibration damping effect is worse. By making the ratio of the mass of vibration damping oscillator 121 to the sum of the masses of the mover component 221 and the movable knife head greater than or equal to 0.9 and less than or equal to 1.1, the overall vibration amplitude of the driving device 200 is basically the same as the vibration amplitude of the vibration damping oscillator 121, then the vibration damper 120 can absorb the vibration of the handle 100 to a greater extent and improve the quality of the product.

The mass of vibration damping oscillator 121 is also affected by the size of suspension space 111 in a lateral direction. Combined with the above embodiments where the suspension space 111 is defined on the bracket body 110, furthermore, the mass of the vibration damping oscillator 121 is negatively correlated with a gap between the side wall of the vibration damping oscillator 121 in the predetermined direction and an inner wall of the suspension space 111. It is understood that when the gap between the side wall of the vibration damping oscillator 121 in the predetermined direction and the inner wall of the suspension space 111 is large, the vibration amplitude allowed for the vibration damping oscillator 121 is large, which can make the mass of the vibration damping oscillator 121 set smaller. When the gap between the side wall of the vibration damping oscillator 121 and the inner wall of the suspension space 111 in the predetermined direction is small, the vibration amplitude allowed for the vibration damping oscillator 121 is small, and it is necessary to make the mass of the vibration damping oscillator 121 set larger. By making the mass of the vibration damping oscillator 121 negatively correlated with the gap between the side wall of the vibration damping oscillator 121 in the predetermined direction and the inner wall of the suspension space 111, an effective oscillation of the vibration damper 120 may be ensured, thereby making the vibration damper 120 more effective in cushioning and damping.

In some embodiments, referring to FIG. 1 and FIG. 2, the electric shaver further includes a housing 600. The housing 600 includes a shank housing 610 and a head housing 620 connected to a top of the shank housing 610, the driving device 200 is fixedly arranged in the head housing 620, and the handle 100 is arranged in the shank housing 610; the bracket body 110 defines a recess 114 adjacent to an upper part of the counterweight block 122, a sealing ring 700 is embedded in the recess 114, and the bracket body 110 is connected to an inner wall surface of the housing 600 through the sealing ring 700; an outer wall surface of the vibration damping oscillator 121 is spaced from the inner wall surface of the housing 600. The housing 600 provides protection for the handle 100, the driving device 200, etc. Specifically, the motor of the driving device 200 may be screwed to the housing 600 to achieve the fixation of the driving device 200 in the head housing 620 of the housing 600. By defining the recess 114 on the bracket body 110, the bracket body 110 abuts against the inner wall surface of the housing 600 through the sealing ring 700, thereby avoiding the bracket body 110 from directly contacting the housing 600, which may further prevent the vibration of the bracket body 110 from being directly transferred to the housing 600 and thus weakens the user's hand grip vibration.

Finally, it should be noted that the above embodiments are only intended to illustrate the technical solution of the present disclosure, not to limit it; despite the detailed description of the present disclosure with reference to the foregoing embodiments, it is understood by those skilled in the art that it is still possible to modify the technical solution recorded in the foregoing embodiments, or to replace some of the technical features with equivalent ones; and these modifications or replacements do not drive the essence of the technical solutions away from the spirit and scope of the technical solutions of the embodiments of the present disclosure.

What is claimed is:

1. An electric shaver, comprising a handle, and a driving device and a hair cutting unit that are disposed at one end of the handle;

wherein the driving device comprises a motor housing, and a base, a mover component, a stator component, an elastic suspension component, and an elastic support that are disposed in the motor housing; the stator component is fixedly arranged on the base; an end of the elastic suspension component is fixedly connected to the base, and an other end of the elastic suspension component is fixedly connected to the mover component, such that the mover component is spaced apart from the stator component; the base is connected to the motor housing through the elastic support; the stator component is capable of driving the mover component to move reciprocally in a predetermined direction by electromagnetic action; the mover component is connected to the hair cutting unit to drive the hair cutting unit to cut hair;

the handle comprises a bracket body and a vibration damping device, and the motor housing is fixedly connected to one end of the bracket body; the vibration damping device comprises a vibration damping oscillator and a cushioning mechanism, and the vibration damping oscillator is suspended and fixedly connected to the bracket body through the cushioning mechanism, the vibration damping oscillator oscillates reciprocally in the predetermined direction, an oscillation direction of the vibration damping oscillator is opposite to a reciprocal motion direction of the mover component, thereby absorbing an angular vibration of the handle triggered by the driving device.

2. The electric shaver according to claim 1, wherein the bracket body is in a shape of an elongated strip extending up and down, and the vibration damping device is arranged at an end of the bracket body away from the driving device.

3. The electric shaver according to claim 2, further comprising a battery embedded in the bracket body and disposed between the vibration damping device and the driving device.

4. The electric shaver according to claim 1, wherein the bracket body defines a suspension space, and the cushioning mechanism comprises two buffer members; each end of the vibration damping oscillator in the predetermined direction is fixedly connected to the bracket body through a corresponding buffer member to be suspended in the suspension space.

5. The electric shaver according to claim 4, wherein each buffer member comprises at least one plate spring structure extending in a form of a disc; a central connection end of the plate spring structure is fixedly connected to an end of the vibration damping oscillator in the predetermined direction, and an external connection end of the plate spring structure is fixedly connected to the bracket body.

6. The electric shaver according to claim 5, wherein the vibration damping device comprises a connection block fixedly connected to the bracket body; the external connection ends of the two buffer members are fixedly connected to two ends of the connection block, respectively, and the connection block is spaced apart from the vibration damping oscillator.

7. The electric shaver according to claim 6, wherein the vibration damping oscillator comprises a counterweight block and a central shaft; the central shaft is threaded and limited around an axis of the central shaft to be arranged at the counterweight block, and two ends of the central shaft are fixedly connected to the two central connection ends, respectively.

8. The electric shaver according to claim 7, wherein the central connection end is arranged with a positioning jack, and the central shaft is inserted in the positioning jack; the vibration damping device further comprises a first connector, and the first connector penetrates the positioning jack and an end of the central shaft to be fixedly connected to the central connection end and the central shaft.

9. The electric shaver according to claim 8, wherein the two ends of the central shaft protrude from the counterweight block, and the vibration damping device further comprises a first spacer and a second spacer disposed on both sides of the plate spring structure, respectively; the first spacer is sleeved on an outer periphery of the central shaft and sandwiched between the central connection end and the counterweight block; the second spacer is sandwiched between the first connector and the central connection end; the bracket body defines a position avoidance hole facing the first connector, and an inner wall surface of the position avoidance hole is disposed at a periphery of an outer peripheral wall of the second spacer.

10. The electric shaver according to claim 6, wherein each of opposite side wall surfaces of the connection block extending along the predetermined direction are recessed to define a limiting slot; a top wall of the suspension space is arranged with two limiting protrusions that are opposite to each other and spaced apart; the two limiting protrusions are correspondingly embedded in the two limiting slots to limit a movement of the connection block relative to the bracket body in the predetermined direction; the electric shaver further comprises a second connector penetrating a corresponding limiting protrusion and is fixedly connected to the bracket body and the connection block.

11. The electric shaver according to claim 1, wherein a difference between an inherent frequency of the vibration damping device and an inherent frequency of the driving device is greater than or equal to −5 HZ and less than or equal to 5 HZ; and/or, a mass of the vibration damping oscillator is positively correlated with a mass of the mover component.

12. The electric shaver according to claim 1, further comprising a housing; wherein the housing comprises a shank housing and a head housing connected to one end of the shank housing, the driving device is fixedly arranged in the head housing, and the handle is arranged in the shank housing; the bracket body defines a recess adjacent to an upper part of the counterweight block, a sealing ring is embedded in the recess, and the bracket body is connected to an inner wall surface of the housing through the sealing ring; an outer wall surface of the vibration damping oscillator is spaced from the inner wall surface of the housing.

13. An electric shaver, comprising a handle, and a driving device and a hair cutting unit that are disposed at one end of the handle;

wherein the driving device comprises a motor housing, and a base, a mover component, a stator component, an elastic suspension component, and an elastic support that are disposed in the motor housing; the stator component is fixedly arranged on the base; an end of the elastic suspension component is fixedly connected to the base, and an other end of the elastic suspension component is fixedly connected to the mover component, such that the mover component is spaced apart from the stator component; the base is connected to the motor housing through the elastic support; the stator component is capable of driving the mover component to move reciprocally in a predetermined direction by electromagnetic action; the mover component is connected to the hair cutting unit to drive the hair cutting unit to cut hair;

the handle comprises a bracket body and a vibration damping device, and the motor housing is fixedly connected to one end of the bracket body; the vibration damping device comprises a vibration damping oscillator and a cushioning mechanism, and the vibration damping oscillator is suspended and fixedly connected to the bracket body through the cushioning mechanism, to absorb an angular vibration of the handle triggered by the driving device;

wherein the bracket body defines a suspension space, and the cushioning mechanism comprises two buffer members; each end of the vibration damping oscillator in the predetermined direction is fixedly connected to the bracket body through a corresponding buffer member to be suspended in the suspension space;

wherein each buffer member comprises at least one plate spring structure extending in a form of a disc; a central connection end of the plate spring structure is fixedly connected to an end of the vibration damping oscillator in the predetermined direction, and an external connection end of the plate spring structure is fixedly connected to the bracket body.

14. The electric shaver according to claim 13, wherein the vibration damping device comprises a connection block fixedly connected to the bracket body; the external connection ends of the two buffer members are fixedly connected to two ends of the connection block, respectively, and the connection block is spaced apart from the vibration damping oscillator.

15. The electric shaver according to claim 14, wherein the vibration damping oscillator comprises a counterweight block and a central shaft; the central shaft is threaded and limited around an axis of the central shaft to be arranged at the counterweight block, and two ends of the central shaft are fixedly connected to the two central connection ends, respectively.

16. The electric shaver according to claim 15, wherein the central connection end is arranged with a positioning jack, and the central shaft is inserted in the positioning jack; the vibration damping device further comprises a first connector, and the first connector penetrates the positioning jack and an end of the central shaft to be fixedly connected to the central connection end and the central shaft.

17. The electric shaver according to claim 16, wherein the two ends of the central shaft protrude from the counterweight block, and the vibration damping device further comprises a first spacer and a second spacer disposed on both sides of the plate spring structure, respectively; the first spacer is sleeved on an outer periphery of the central shaft and sandwiched between the central connection end and the counterweight block; the second spacer is sandwiched between the first connector and the central connection end; the bracket body defines a position avoidance hole facing the first connector, and an inner wall surface of the position avoidance hole is disposed at a periphery of an outer peripheral wall of the second spacer.

18. The electric shaver according to claim 14, wherein each of opposite side wall surfaces of the connection block extending along the predetermined direction are recessed to define a limiting slot; a top wall of the suspension space is arranged with two limiting protrusions that are opposite to each other and spaced apart; the two limiting protrusions are correspondingly embedded in the two limiting slots to limit a movement of the connection block relative to the bracket body in the predetermined direction; the electric shaver further comprises a second connector penetrating a corresponding limiting protrusion and is fixedly connected to the bracket body and the connection block.

19. The electric shaver according to claim 13, wherein a difference between an inherent frequency of the vibration damping device and an inherent frequency of the driving device is greater than or equal to −5 HZ and less than or equal to 5 HZ; and/or, a mass of the vibration damping oscillator is positively correlated with a mass of the mover component.

20. An electric shaver, comprising a handle, and a driving device and a hair cutting unit that are disposed at one end of the handle;

wherein the driving device comprises a motor housing, and a base, a mover component, a stator component, an elastic suspension component, and an elastic support that are disposed in the motor housing; the stator component is fixedly arranged on the base; an end of the elastic suspension component is fixedly connected to the base, and an other end of the elastic suspension component is fixedly connected to the mover component, such that the mover component is spaced apart from the stator component; the base is connected to the motor housing through the elastic support; the stator component is capable of driving the mover component to move reciprocally in a predetermined direction by electromagnetic action; the mover component is connected to the hair cutting unit to drive the hair cutting unit to cut hair;

the handle comprises a bracket body and a vibration damping device, and the motor housing is fixedly connected to one end of the bracket body; the vibration damping device comprises a vibration damping oscillator and a cushioning mechanism, and the vibration damping oscillator is suspended and fixedly connected to the bracket body through the cushioning mechanism, to absorb an angular vibration of the handle triggered by the driving device;

the electric shaver further comprises a battery embedded in the bracket body and disposed between the vibration damping device and the driving device.

* * * * *